(12) United States Patent
Ali et al.

(10) Patent No.: US 10,688,444 B2
(45) Date of Patent: Jun. 23, 2020

(54) THIN FILM COMPOSITE MEMBRANES FOR FLUID SEPARATIONS

(71) Applicant: King Abdullah University of Science and Technology, Thuwal (SA)

(72) Inventors: Zain Ali, Thuwal (SA); Ingo Pinnau, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 0 days.

(21) Appl. No.: 16/356,343

(22) Filed: Mar. 18, 2019

(65) Prior Publication Data
US 2019/0209975 A1 Jul. 11, 2019

Related U.S. Application Data

(63) Continuation of application No. PCT/IB2018/053670, filed on May 23, 2018.
(Continued)

(51) Int. Cl.
*B01D 69/12* (2006.01)
*B01D 53/22* (2006.01)
(Continued)

(52) U.S. Cl.
CPC ......... *B01D 69/125* (2013.01); *B01D 53/228* (2013.01); *B01D 67/0006* (2013.01); *B01D 69/02* (2013.01); *B01D 71/56* (2013.01); *B01D 2256/12* (2013.01); *B01D 2256/16* (2013.01); *B01D 2256/245* (2013.01);
(Continued)

(58) Field of Classification Search
None
See application file for complete search history.

(56) References Cited

U.S. PATENT DOCUMENTS 5,085,775 A  2/1992  Swamikannu
5,368,889 A  11/1994  Johnson
(Continued)

OTHER PUBLICATIONS

Albo, et al., "Gas transport properties of interfacially polymerized polyamide composite membranes under different pre-treatments and temperatures", Journal of Membrane Science, 2014, 109-118.
(Continued)

*Primary Examiner* — Krishnan S Menon
(74) *Attorney, Agent, or Firm* — Billion & Armitage; Gregory S. Schwartz

(57) ABSTRACT

Embodiments of the present disclosure describe a method of fabricating a thin-film composite membrane comprising immersing a porous support in an aqueous solution containing a diamine; contacting the immersed porous support with an organic solution containing a multifunctional acyl chloride for at least 5 minutes and at a temperature of at least 50° C. to form via interfacial polymerization a polyamide thin film on the porous support; and drying the thin-film composite membrane at about room temperature. Embodiments of the present disclosure further describe a method of separating fluids comprising contacting a defect-free polyamide-thin-film composite membrane with a fluid composition and capturing one or more chemical species from the fluid composition.

10 Claims, 11 Drawing Sheets

Related U.S. Application Data

(60) Provisional application No. 62/515,237, filed on Jun. 5, 2017, provisional application No. 62/520,067, filed on Jun. 15, 2017.

(51) Int. Cl.
| | |
|---|---|
| B01D 71/56 | (2006.01) |
| B01D 67/00 | (2006.01) |
| B01D 69/02 | (2006.01) |

(52) U.S. Cl.
CPC .. *B01D 2257/102* (2013.01); *B01D 2257/504* (2013.01); *B01D 2325/04* (2013.01)

(56) References Cited

U.S. PATENT DOCUMENTS

| | | | |
|---|---|---|---|
| 2012/0080381 | A1 | 4/2012 | Wang |
| 2012/0305473 | A1* | 12/2012 | Ogawa ................ B01D 69/02 210/500.38 |
| 2014/0224728 | A1 | 8/2014 | Kim |
| 2015/0231572 | A1* | 8/2015 | Vankelecom ...... B01D 67/0013 427/337 |
| 2017/0065937 | A1 | 3/2017 | Dom |

OTHER PUBLICATIONS

Berchtold, et al., "Polybenzimidazole composite membranes for high temperature synthesis gas separations", Journal of Membrane Science, 2012, 265-270.
Bryden, et al., "Nanostructured palladium-iron membranes for hydrogen separation and membrane hydrogenation reactions", Journal of Membrane Science 203, 2002, 29-42.
Buchanan, et al., "Capital and Operating Cost of Hydrogen Production from Coal Gasification", Pittsburgh, 2003, 1-20.
Cadotte, "A New Thin-Film Composite Seawater Reverse Osmosis Membrane", Desalination, 1980, 25-31.
Duan, "Liquid and Gas Permeation Studies on the Structure and Properties of Polyamide Thin-Film Composite Membranes", Nov. 2014, 1-189.
Ghosh, et al., "Impacts of reaction and curing conditions on polyamide composite reverse osmosis membrane properties", Journal of Membrane Science, 2008, 34-45.
Glueckstern, "Comparative Cost of UF vs. Conventional Pretreatment for SWRO Systems", Tel Aviv, 2004, 21-30.
Hansen, et al., "Global Surface Temperature Change", Rev. Geophys., 48, RG4004, doi:10.1029/2010RG000345, Dec. 14, 2010, 29 pages.
Hinchliffe, et al., "A Comparison of Membrane Separation and Distillation", Trans IChemE, vol. 78, Part A, Mar. 2000, 255-268.
Hosseini, "Gas separation membranes developed through integration of polymer blending and dual-layer hollow fiber spinning process for hydrogen and natural gas enrichments", Journal of Membrane Science, 2010, 156-166.
Japip, et al., "Molecularly Tuned Free Volume of Vapor Cross-Linked 6FDA-Durene/ZIF-71 MMMs for H2/CO2 Separation at 150° C.", Advanced Materials, 2017, 1-6.
Jimenez-Solomon, et al., "Polymer nanofilms with enhanced microporosity by interfacial polymerization", nature articles, Macmillan Publishers Limited, 2016, 1-10.
Karan, et al., "Sub-10 nm polyamide nanofilms with ultrafast solvent transport for molecular separation", Research, Jun. 19, 2015, 1347-1351.
Kim, et al., "Positron Annihilation Spectroscopic Evidence to Demonstrate the Flux-Enhancement Mechanism in Morphology-Controlled Thin-Film-Composite (TFC) Membrane", Environ. Sci. Technol, American Chemical Society, 2005, 1764-1770.
Klara, "Cost and Performance Baseline for Fossil Energy Plants", National Energy Technology Laboratory, 2007, 1-516.
Louie, "Effects of surface coating process conditions on the water permeation and salt rejection properties of composite polyamide reverse osmosis membranes", Journal of Membrane Science, 2011, 249-255.
Louie, et al., "Gas and liquid permeation properties of modified interfacial composite reverse osmosis membranes", Journal of Membrane Science, 2008, 793-800.
Ma, "Hydrogen Separation Membranes", Advanced Membrane Technology and Applications, 2008, 671-684.
Mehio, et al., "Quantum Mechanical Basis for Kinetic Diameters of Small Gaseous Molecules", The Journal of Physical Chemistry, 2014, 1150-1154.
Merkel, et al., "Carbon dioxide capture with membranes at an IGCC power plant", Journal of Membrane Science, 2012, 441-450.
Ockwig, et al., "Membranes for Hydrogen Separation", Chem. Rev. 107, Oct. 10, 2007, 4078-4110.
Pacheco, et al., "3D visualization of the internal nanostructure of polyamide thin films in RO membranes", Journal of Membrane Science, 2016, 33-44.
Pacheco, et al., "Characterization of isolated polyamide thin films of RO and NF membranes using novel TEM techniques", Journal of Membrane Science, 2010, 51-59.
Pesiri, et al., "Thermal optimization of polybenzimidazole meniscus membranes for the separation of hydrogen, methane, and carbon dioxide", Journal of Membrane Science, 2003, 11-18.
Robeson, "The upper bound revisited", Journal of Membrane Science, 2008, 390-400.
Sanchuan, et al., "Performance enhancement in interfacially synthesized thin-film composite polyamide-urethane reverse osmosis membrane for seawater desalination", Journal of Membrane Science, 2009, 313-320.
Scholes, et al., "Carbon Dioxide Separation through Polymeric Membrane Systems for Flue Gas Applications", Bentham Science Publishers Ltd., 2008, 52-66.
Shenvi, et al., "A review on RO membrane technology: Developments and challenges", Desalination, 2015, 10-26.
Spillman, "Economics of gas separation membrane processes", Chapter 13, 590-667.
Teichmann, et al., "Liquid Organic Hydrogen Carriers as an efficient vector for the transport and storage of renewable energy", International Journal of Hydrogen Energy 37, Sep. 27, 2012, 18118-18132.
Tingxu, et al., "High performance ZIF-8/PBI nano-composite membranes for high temperature hydrogen separation consisting of carbon monoxide and water vapor", International Journal of Hydrogen Energy, 2013, 229-239.
U.S. Department of Energy, "Advanced Carbon Dioxide Capture R&D Program: Technology Update: Pre-combustion membranes", Pittsburgh, May 2013, 1-145.
US Department of Energy, "Basic Research Needs for the Hydrogen Economy", Workshop on hydrogen production, storage and use., Lemont, May 2003, 1-178.
Weinkauf, "Gas Transport Properties of Liquid Crystalline Poly (p-phenyleneterephthalamide)", Macromolecules, American Chemical Society, 1992, 788-796.
Yildiz, et al., "Configuration and Technology Implications of Potential Nuclear Hydrogen System Applications", Nuclear Engineering Division Argonne National Laboratory, Jul. 31, 2005, 133 pages.
Notification of Transmittal of the International Search Report and the Written Opinion of the International Searching Authority, or the Declaration for PCT/IB2018/053670 dated Aug. 14, 2018.
Albo, et al., "Gas transport properties of interfacially polymerized polyamide composite membranes under different pre-treatments and temperatures", Journal of Membrane Science, 449, 2014, 109-118.
Ali, et al., "Ultra-selective defect-free interfacially polymerized molecular sieve thin-film composite membranes for H2 purification", Journal of Materials Chemistry A, 6,, Oct. 9, 2017, 30-35.
Ghosh, et al., "Impacts of reaction and curing conditions on polyamide composite reverse osmosis membrane properties", Journal of Membrane Science, 311, 2008, 34-45.
Sridhar, et al., "Gas permeation properties of polyamide membrane prepared by interfacial polymerization", J. Mater.Sci., 42, 2007, 9392-9401.

(56) References Cited

OTHER PUBLICATIONS

Wang, et al., "A high performance antioxidative and acid resistant membrane prepared by interfacial polymerization for CO2 separation from flue gas", Energy Environ. Sci., 6,, 2013, 539-551.
Haussinger, et al., "Hydrogen, 2. Production", Wiley-VCH Verlag GmbH & Co., 2012, 249-308.

* cited by examiner

THIN FILM COMPOSITE MEMBRANES FOR FLUID SEPARATIONS

BACKGROUND

In the last few decades, a direct correlation between industrial greenhouse gas emissions and global temperature rise has been established. At the same time global energy demand continues to rise. A way to sustainably transport energy is to use hydrogen gas, which has a high energy storage capacity of 119 MJ/kg and produces only water upon combustion. Approximately $8.3 \times 10^{11}$ $m^3$ of hydrogen—carrying $6 \times 10^{12}$ MJ of energy—is produced annually, with over 90% from fossil fuels (mainly methane and coal) or derivatives such as biomass. A much smaller fraction is produced using water electrolysis.

During steam cracking of natural gas (steam-methane reforming, SMR), methane is first reacted with water at ~800° C. to produce CO and $H_2$. Then the $H_2$/CO feed is converted at about 350° C. into a mixture of $H_2$ and $CO_2$. Composition of output streams can vary depending on the specific method employed. A typical SMR plant produces a $^{75}/_{20}$ $H_2/CO_2$ ratio with 5% methane and <1% other impurities. Integrated Gasification Combined Cycle (IGCC) plants can produce $H_2/CO_2$ ratios of 50/50.

Currently about 50% of hydrogen is used for the production of ammonia for use as fertilizer by the Haber process, while the remaining is employed in hydrocracking i.e. breaking large hydrocarbons into smaller ones for use as fuel. Smaller proportions are used for production of methanol, plastics, pharmaceuticals, hydrogenation of oils, desulfurization of fuels, etc. Hydrogen production is growing at 10% annually, but it is estimated that availability of lower-cost could immediately boost its use by 500 to 1000%.

The state-of-the-art technologies for $H_2$ purification, i.e. cryogenic distillation and pressure swing adsorption, are energy intensive. This adds a significant cost for synthesized hydrogen estimated around 30% of total plant capital and operating cost. Estimates show that membrane-based $H_2/CO_2$ separation can reduce process costs up to 80% compared to distillation. Such debottlenecking of $H_2$ production processes could enable the dream of a hydrogen-driven economy.

The USDOE lists membrane performance targets for hydrogen purification from syngas mixtures. See Table 1. A number of materials are being considered, including inorganics such as carbon molecular sieve, zeolite, and metal membranes, and glassy polymers such as polybenzimidazole and polyimides. The latter have been explored both in pristine form and with nanoparticles. The economic and environmental benefits of using membranes for $H_2/CO_2$ separations have been discussed by others arguing that use of membranes with high $H_2/CO_2$ selectivities (>10) can significantly reduce hydrogen production cost. Proteus™ by Membrane Technology & Research Inc. is a commercial membrane offering $H_2/CO_2$ selectivity of approximately 11 with $H_2$ permeance of 500 GPU (1 GPU=$10^{-6}$ $cm^3$(STP) $cm^{-2}$ $s^{-1}$ cmHg) during 150° C. mixed-gas operation.

TABLE 1

| USDOE specified requirements for $H_2/CO_2$ membranes |
| --- |
| Low fabrication cost: approximately 100 USD/$ft^2$ or lower |
| Ability to manufacture large membrane areas and modules |
| High operating temperature: 130-150° C. and above |
| High pressure operability: 7 bar and above |

TABLE 1-continued

| USDOE specified requirements for $H_2/CO_2$ membranes |
| --- |
| High hydrogen purity and recovery |
| High durability: around 5 years |
| Performance: $H_2$ permeance > 200 GPU |
| Mixed-gas $H_2/CO_2$ selectivity @ 150° C. > 12 (IGCC operation) |

Interfacial polymerization (IP) is a commercial method for fabricating thin-film composite (TFC) membranes. Pioneered by Cadotte (U.S. Pat. No. 4,277,344), IP has been employed in industry for decades to fabricate TFCs with polyamide active layers used for desalination by reverse osmosis (RO). These TFCs have a structure of partially cross-linked polyamide fabricated by reacting m-phenylenediamine (MPD) and trimesoyl chloride (TMC) on a microporous polysulfone support. The original membrane of this chemistry was named "FT-30". This membrane and derivatives thereof are currently employed in more than 15,000 desalination plants, accounting for 90% of the global market.

In commercial settings, the FT-30-type TFC membranes are produced by impregnating (via dipping or spraying) a highly porous support material (usually polysulfone) with MPD dissolved in water. The support roll passes through a roller and is very briefly (less than 60 seconds) exposed to TMC dissolved in a hydrocarbon solvent (n-hexane or Isopar®). All solutions are at room temperature (20-25° C.). The membrane is then immediately exposed to high temperatures (≈20-100° C.) for drying and curing of the polyamide. All such membranes have been laboriously studied and reported in the literature with no useable gas separation properties for commercial separation processes.

Accordingly, it would be desirable to form a thin-film composite membrane with properties suitable for gas separations using fabrication methods that are energy efficient and low cost.

SUMMARY

In general, embodiments of the present disclosure describe thin-film composite membranes, including methods of fabricating a thin-film composite membrane and methods of separating fluid compositions via the thin-film composite membranes of the present disclosure.

Accordingly, embodiments of the present disclosure describe a method of fabricating a thin-film composite membrane comprising immersing a porous support in an aqueous solution containing a diamine; and contacting the immersed porous support with an organic solution containing an acyl chloride for at least 5 minutes and at a temperature of at least 50° C. to form via interfacial polymerization a polyamide thin film on the porous support.

Embodiments of the present disclosure further describe a method of separating fluids comprising contacting a defect-free polyamide-thin-film composite membrane with a fluid composition and capturing one or more chemical species from the fluid composition.

Another embodiment of the present disclosure is a thin-film composite membrane comprising a defect-free polyamide-thin-film composite membrane for separating fluid compositions, wherein the membrane is formed via an interfacial polymerization reaction in which a porous support impregnated with an aqueous solution containing a diamine is contacted with an organic solution containing an acyl chloride for at least 5 minutes and at a temperature of at least 50° C.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which:

FIGS. 6a, 6c, and 6e are graphical views of permeance (GPU) versus kinetic diameter (Å), according to one or more embodiments of the present disclosure. FIGS. 6b, 6d, and 6f are graphical views of selectivity for various species in fluid compositions, according to one or more embodiments of the present disclosure.

FIG. 8a is a graphical view showing pure-gas temperature dependence for $H_2$ and $CO_2$ of the 0.1TMC-100C membrane, according to one or more embodiments of the present disclosure. FIG. 8b is a graphical view of a Robeson plot comparing gas separation performances of various membranes, according to one or more embodiments of the present disclosure.

DETAILED DESCRIPTION

Figure 1:
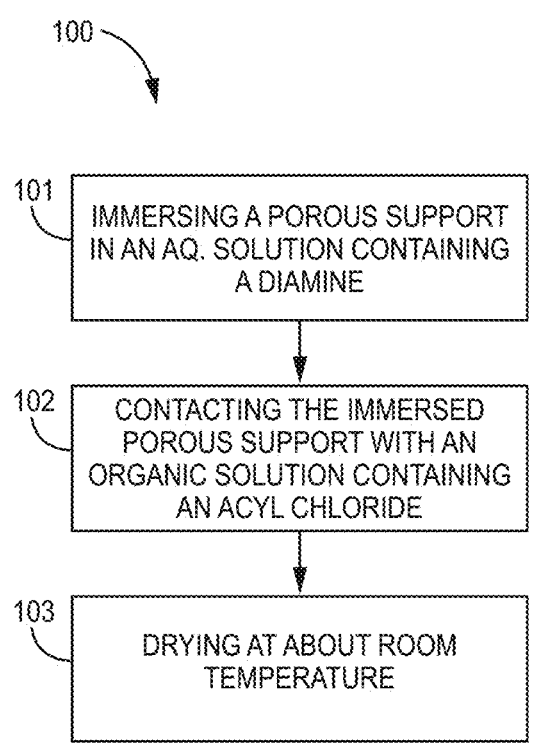
FIG. 1 is a schematic diagram of a method of fabricating a thin-film composite membrane, according to one or more embodiments of the present disclosure.

The invention of the present disclosure relates to thin-film composite membranes, including methods of fabricating thin-film composite membranes and methods of separating fluid compositions using the thin-film composite membranes. The thin-film composite membranes of the present disclosure may include at least a polyamide thin film on a porous support. The polyamide thin film may be formed on the porous support via interfacial polymerization by contacting a porous support impregnated with an aqueous solution containing a diamine with an organic solution containing an acyl chloride for at least about 5 minutes at a temperature of at least about 50° C. Fabricating thin-film composite membranes according to the methods of the present disclosure may produce highly crosslinked defect-free ultrathin-film composite membranes with unprecedented gas separation performance characteristics and high stability. The thin-film composite membranes of the present disclosure may be easily and economically manufactured, making them especially attractive candidates for $H_2$ purification, among other separation applications.

Interfacial polymerization is a polymerization reaction that occurs at an interface between an aqueous solution containing a monomer and an organic solution containing another monomer. Interfacial polymerization for synthesis of thin-film composite (TFCs) polyamide membranes fabricated on highly porous supports was first applied for water desalination. The TFCs showed excellent desalination properties (rejection) and high water flux as well as high chemical stability, low fabrication cost, and the ability to be manufactured reproducibly in large surface areas. These polyamide membranes have been in commercial production and used for water desalination purposes for decades, but exhibit no gas separation capabilities.

Gas separation properties of commercial state-of-the-art polyamide membranes exhibit Knudsen diffusion, implying surface defects rendering them unsuitable for gas separation applications because gas-pair selectivity is very low due to transport by pore flow. Only a few attempts were made to manufacture TFCs by interfacial polymerization for gas separation applications, but all reported literature confirmed none of the membranes exhibited any potential for large-scale commercial gas separation applications.

In commercial settings, the membranes are produced by impregnating a highly porous support material with a multi-amine dissolved in water. The support roll passes through a roller and is very briefly (e.g., for 10 to 60 seconds) exposed to a multi-functional acyl halide dissolved in a hydrocarbon solvent. All solutions and reactions occur at room temperature (e.g., 20° C. to 25° C.). The membrane is then immediately exposed to high temperature ranging from 80° C. to 100° C. for drying and curing of the polyamide. All such membranes have been laboriously studied and reported in the literature with no useable gas separation properties for commercial separation processes. Gas permeation studies of FT-30-type membranes (made from m-phenylene diamine and trimesoyl chloride) established that they exhibited Knudsen diffusion, implying surface defects.

Accordingly, the invention of the present disclosure relates to, among other things, the fabrication of highly crosslinked defect-free ultrathin polyamide membranes with unprecedented gas separation properties. Gas transport is determined by a solution/diffusion process, as opposed to the conventional Knudsen diffusion (pore flow) mechanism, which is observed for previously reported TFCs made by interfacial polymerization. The novel TFC membranes formed according to the methods of the present disclosure are particularly suitable for numerous large-scale commercial gas separation applications. At least some of the novel features of the present invention include long contact (reaction) times (≥5 minutes) to enable the formation of a defect-free polyamide layer and reaction temperatures preferably ≥50° C., more preferably ≥80° C., and most preferably ≥100° C. These novel features and others are described in greater detail herein.

Definitions

The terms recited below have been defined as described below. All other terms and phrases in this disclosure shall be construed according to their ordinary meaning as understood by one of skill in the art.

As used herein, "capturing" refers to the act of removing one or more chemical species from a bulk fluid composition (e.g., gas/vapor, liquid, and/or solid). For example, "capturing" may include, but is not limited to, interacting, bonding, diffusing, adsorbing, absorbing, reacting, and sieving, whether chemically, electronically, electrostatically, physically, or kinetically driven.

As used herein, "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture. Accordingly, treating, tumbling, vibrating, shaking, mixing, and applying are forms of contacting to bring two or more components together.

As used herein, "contacting" may, in the alternative, refer to, among other things, feeding, flowing, passing, injecting, introducing, and/or providing the fluid composition (e.g., a feed gas).

As used herein, "defect-free" refers to a selective polymer film that permeates gases by a molecular solution/diffusion mechanism with gas-pair selectivites higher than those obtained by pore flow, specifically Knudsen diffusion.

As used herein, "immersing" refers to, among other things, dipping, spraying, coating, pouring, submerging, wetting, and any other method known in the art.

As used herein, "TFC" or "TFCs" refers to thin-film composite membranes.

In general, the thin-film composite membranes may be multi-layered. For example, the thin-film composite membranes may include one or more of a porous support, a gutter layer, a selective layer, and a protective layer. In many embodiments, as described in more detail herein, the thin-film composite membranes include a selective layer—for example, the polyamide thin film—fabricated on a porous support. Other embodiments may further include a gutter layer and/or protective layer. In embodiments further including a gutter layer, the gutter layer is provided between the selective layer and the porous support. In some embodiments, the gutter layer prevents diluted polymer solution from penetrating the porous support and blocking pores. The gutter layer may include or be fabricated from, for example, intrinsically microporous polymers, such as di-substituted polyacetylenes, ladder polymers and polyimides, and other highly gas permeable glassy and rubbery polymers known in the art. In embodiments further including a protective layer, the protective layer is provided on an opposing side of the selective layer and otherwise exposed. A protective layer may be applied to protect the selective layer for membrane module fabrication. In many embodiments, a protective layer is preferably not included, as the polyamide layer is generally defect free (e.g., substantially defect free).

FIG. 1 is a schematic diagram of a method 100 of fabricating a thin-film composite membrane, according to one or more embodiments of the present disclosure. As shown in FIG. 1, a porous support is immersed 101 in an aqueous solution containing a diamine. The immersed porous support is then contacted 102 with an organic solution containing an acyl chloride for at least about 5 minutes and at a temperature of at least about 50° C. to form via interfacial polymerization a polyamide thin film on the porous support. The thin-film composite membrane may be optionally dried 103 at room temperature.

At step 101, a porous support is immersed in an aqueous solution containing a diamine. Immersing may refer to, among other things, dipping, spraying, coating, pouring, submerging, wetting, and any other method known in the art. In some embodiments, the porous support is fixed to a frame and then the aqueous solution containing a diamine may be poured thereon sufficient to submerge the porous support in the diamine-containing aqueous solution. In many embodiments, immersing the porous support in the diamine-containing aqueous solution impregnates the porous support with the aqueous solution containing the diamine. The porous support may be immersed in the diamine-containing aqueous solution for about 1 minutes to about 30 minutes. In many embodiments, the porous support is immersed in the diamine-containing aqueous solution for about 5 minutes. In the most preferred embodiment, the porous support is immersed in the diamine-containing aqueous solution for up to 2 minutes The porous support (e.g., porous base membrane or porous support membrane) may include one or more polymer materials and/or may be highly porous. The porous support may be in any geometric form, that is, flat-sheet or hollow fiber. In many embodiments, the porous support includes polysulfone. In other embodiments, the porous support includes one or more of polyethersulfone, polyimide, polyetherimide, polyacrylonitrile, cellulose ester, polypropylene, polyvinyl chloride, polyvinylidene difluoride, and poly(arylether) ketones. The porous support may further include optional backing to reinforce the porous support. The backing may include a fabric or non-woven web material. For example, the porous support may be reinforced by one or more of films, sheets, and nets. The thickness of the porous support may range from about 50 microns to about 500 microns. In the most preferred embodiments, the thickness of the porous support ranges from about 50 microns to about 200 microns. While not a particular focus of the present invention, the porous support may be fabricated according to methods known in the art. For example, the porous support may be formed via casting procedures and/or phase-inversion.

The aqueous solution contains at least a diamine. In many embodiments, the diamine is at least m-phenylene diamine and accordingly the aqueous solution containing a diamine is m-phenylene diamine dissolved in water. In other embodiments, the diamine includes one or more of m-phenylene, p-phenylene diamine, 3,5-diaminobenzoic acid, diaminotoluene, diaminophenol, diamino resorcinol, 3,5-diaminobenzonitrile, piperazine, and combinations thereof. The concentration of the diamine in the aqueous solution may range from about 0.1 wt/vol % to about 10 wt/vol %. In many embodiments, the concentration of the diamine in the aqueous solution is about 1 wt/vol %. In other embodiments, the concentration of the diamine in the aqueous solution is about 2 wt/vol %.

At step 102, the immersed porous support is then contacted 102 with an organic solution containing an acyl halide. The organic solution containing an acyl halide may be immiscible or substantially immiscible in the aqueous solution containing the diamine. For example, the organic solution may be a water-immiscible solvent containing any hydrocarbon. The hydrocarbon of the organic solution may include a linear or branched saturated or unsaturated, cyclic or acyclic, or aromatic hydrocarbon. In many embodiments, the organic solution includes one or more of n-hexane and ISOPAR™, ISOPAR™, an iso-paraffinic fluid, is a series from ExxonMobil Chemical that includes, but is not limited to, ISOPAR™ E, ISOPAR™ G, ISOPAR™ H, ISOPAR™ L, and ISOPAR™ M. In many embodiments, the acyl halide is an acyl chloride, such as trimesoyl chloride. In other embodiments, the acyl chloride includes one or more of trimesoyl chloride, terephthalic acid chloride, and isophthalic acid chloride. In some embodiments, the acyl chloride is multifunctional. In a preferred embodiment, the concentration of the acyl chloride monomer is less than about 0.1 wt/vol %. In general, the concentration of the acyl chloride monomer may range from about 0.01 wt/vol % to about 1 wt/vol %. In some embodiments, the organic solution containing a multi-functional acyl halide may further include other additives.

The immersed porous support (e.g., the porous support impregnated with the aqueous solution containing the diamine) is contacted with the organic solution containing an acyl chloride to initiate interfacial polymerization and form a polyamide thin film that is adherent to the porous support. The polyamide thin film may be ultrathin. For example, a thickness of the polyamide thin films may range from about 5 nm to about 500 nm. In many embodiments, the thickness of the polyamide thin film is about 100 nm. In the most preferred embodiment, the thickness of the polyamide thin film is less than 10 nm.

The polyamide thin-film composite membranes produced according to the methods of the present disclosure (e.g., via interfacial polymerization) are defect-free (e.g., substantially defect-free). To produce defect-free polyamide thin films, the immersed support may be contacted with the organic solution containing an acyl chloride for extended periods of time. In conventional methods, the contact time is very short and ranges from about 10 seconds to about 60 seconds. Conventional membranes formed via short contact times exhibit no potential for gas separation applications. In many embodiments of the present disclosure, the immersed support is contacted with the organic solution containing an acyl chloride for at least about 5 minutes. By extending the contact time according to the present method, the polyamide thin films unexpectedly exhibited defect-free (e.g., substantially defect free) characteristics with enhanced and/or increased selectivity for, for example, gas separation applications. Extending the contact time allows the diamine to continue to diffuse into the reaction zone over time, filling larger defect-pores with polymer. Once this occurs, the mode of transport shifts from Knudsen flow to solution-diffusion, and selectivity increases. In this way, among other things, the defect-free polyamide-thin-film composite membranes of the present disclosure exhibit unprecedented gas separation properties.

The selectivity of the thin-film composite membranes may also relate to a degree of crosslinking. The thin-film composite membranes produced via interfacial polymerization according to methods of the present disclosure increase the degree of crosslinking and/or are highly crosslinked. The degree of crosslinking may range from about 0 to about 1. In many embodiments, the degree of crosslinking ranges from about 0.3 to about 0.7, or from about 0.65 to about 0.99. In general, as the degree of crosslinking increases, permeance may decrease for chemical species with larger kinetic diameters (e.g., greater than about 3.0 Å).

An increase in a degree of crosslinking may be observed as the concentration of the acyl chloride decreases and/or as the temperature of the organic phase increases. For example, as the ratio of diamine to acyl chloride increases (e.g., concentration of acyl chloride decreases), permeance for larger gas molecules (e.g., $CO_2$) decreases due to increased crosslinking. Permeance may decrease and selectivity may increase due to a shrinking of free volume elements, resulting in narrower pathways and hindering transport of larger gas molecules while having no significant effect on smaller gas molecules. In addition, an increase of organic-phase temperature may increase crosslinking, affecting gas molecules larger than $H_2$, for example, and increasing selectivity significantly. This is unexpected because the reaction between a diamine and acyl chloride is generally exothermic, and heating the organic phase is expected to lower the rate of polymer formation as equilibrium shifts to reduce heat in the system, resulting in non-continuous films with decreased crosslinking. However, an increase in reaction-zone temperature increases the overall reaction rate and/or reaction kinetics, as well as solubility and diffusivity of the diamine in the organic phase (e.g., reaction zone), resulting in increased formation of amide linkages and thus increased crosslinking.

A highly crosslinked, defect-free polyamide-thin-film composite membrane may exhibit unprecedented selectivity for various chemical species, compounds, molecules, etc. in a fluid composition for various separation applications thereof. For example, the thin-film composite membranes may exhibit a high selectivity for certain chemical species and negligible selectivity for other certain chemical species. In many embodiments, the selectivity is at least 10. The thin-film composite membranes may exhibit a molecular-sieve-like cut-off at various kinetic diameters. In many embodiments, the thin-film composite membranes may exhibit a high selectivity for chemical species with a kinetic diameter of less than about 3 Å with other gases of larger dimensions than 3 Å. For example, the thin-film composite membranes may exhibit a selectivity for hydrogen ($k_d$ is about 2.89 Å) over carbon dioxide ($k_d$ is about 3.30 Å), oxygen ($k_d$ is about Å), nitrogen ($k_d$ is about 3.64 Å), and/or methane ($k_d$ is about 3.80 Å). Moreover, the thin-film composite membranes may also exhibit a selectivity for oxygen over nitrogen, carbon dioxide over nitrogen, and/or carbon dioxide over methane. Other combinations are possible. These examples shall not be construed as limiting.

Accordingly, tuning various reaction conditions, concentrations, parameters, etc. may allow the fabrication of highly crosslinked, defect-free thin-film composite membranes for specific applications. In many embodiments, the immersed support is contacted with the organic solution containing an acyl chloride for at least about 5 minutes and at a temperature of at least about 50° C. In other embodiments, the temperatures and duration of contacting may vary. The temperature at which the immersed porous support is contacted with the acyl chloride-containing organic solution may range from at least about 50° C. to at least about 100° C. In a preferred embodiment, the temperature of the contacting is at least about 80° C. In a most preferred embodiment, the temperature of the contacting is at least about 100° C. The duration for which the immersed support is contacted with the acyl chloride-containing organic solution may range from about 0.1 minute to about 30 minutes. In a preferred embodiment, the duration of contacting is at least about 5 minutes.

At step 103, the thin-film composite membrane may be optionally dried at room temperature. In conventional methods, the membrane must be immediately exposed to high temperatures ranging from about 80° C. to about 100° C. to facilitate drying and curing of the thin film. By only requiring temperatures at about room temperature, the invention of the present disclosure provides an enhanced method that is energy efficient and cost effective relative to conventional methods. In some embodiments, the period of drying time is about 24 hours. However, shorter or longer periods of drying time may be sufficient, as the period of drying time may vary widely and depend on the composition of the thin-film composite membrane and other factors, such as the steps and/or methods used to fabricate it.

Figure 2:
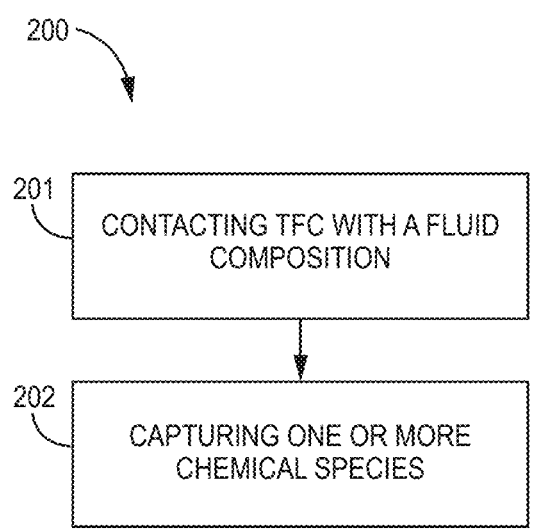
FIG. 2 is a schematic diagram of a method of separating fluid compositions, according to one or more embodiments of the present disclosure.

FIG. 2 is a schematic diagram of a method 200 of separating fluids, according to one or more embodiments of the present disclosure. As shown in FIG. 2, the method includes contacting 201 a defect-free polyamide-thin-film composite membrane with a fluid composition and capturing 202 one or more chemical species from the fluid composition.

At step 201, a defect-free polyamide-thin-film composite membrane is contacted with a fluid composition. The defect-free polyamide-thin-film composite membrane is contacted with the fluid composition. Contacting may refer to, among other things, feeding, flowing, passing, injecting, introducing, and/or providing the fluid composition (e.g., a feed gas). The contacting may occur at various pressures, temperatures, and concentrations of chemical species in the fluid composition, depending on desired feed conditions and/or reaction conditions. The pressure, temperature, and concentration at which the contacting occurred may be varied and/or adjusted according to a specific application. In many embodiments, the contacting may occur with a feed temperature between about 120° C. to about 150° C. and a pressure above 10 bar. At least one novel feature of the present invention is that defect-free polyamide-thin-film composite membrane may be contacted at high temperatures and pressures, which are suitable for gas separations, without degradation. In this way, the defect-free polyamide-thin-film composite membrane exhibits high thermal, chemical, and mechanical stability.

The defect-free polyamide-thin-film composite membrane may include any of the thin film composite membranes described herein and/or produced according to the methods of the present disclosure. In a preferred embodiment, the composite membrane may include a defect-free polyamide thin film made from m-phenylene diamine and trimesoyl chloride formed on a polysulfone porous support. In other embodiments, the porous support may include one or more of polyethersulfone, polyimide, polyetherimide, polyacrylonitrile, cellulose ester, polypropylene, polyvinyl chloride, polyvinylidene difluoride, and poly(arylether) ketones. In addition, the polyamide thin film may be formed from a diamine and an acyl chloride. For example, the diamine may include, but is not limited to one or more of p-phenylene diamine, 3,5-diaminobenzoic acid, diaminotoluene, diaminophenol, diamino resorcinol, 3,5-diaminobenzonitrile, piperazine, and combinations thereof. The acyl chloride may include, but is not limited to, one or more of trimesoyl chloride, terephthalic acid chloride, isophthalic acid chloride, and combinations thereof.

The fluid composition may include one or more chemical species in a liquid phase, a gas/vapor phase, a solid phase, or a combination thereof. In many embodiments, the fluid composition is in a gas/vapor phase. The gas/vapor phase may include natural gas, syngas, flue gas, etc. In many embodiments, the gas/vapor phase includes one or more of $H_2$, $CO_2$, $CH_4$, $O_2$, $N_2$, $H_2O$, He, and one or more other chemical species. In many embodiments, the fluid composition includes at least $H_2$ and $CO_2$. In some embodiments, the fluid composition includes at least $O_2$ and $N_2$. In some embodiments, the fluid composition includes at least $CO_2$ and $CH_4$. In some embodiments, the fluid composition includes at least $H_2$ and $N_2$. In some embodiments, the fluid composition includes at least $CO_2$ and $N_2$.

At step 202, one or more chemical species are captured from the fluid composition. Capturing may refer to the act of removing one or more chemical species from a bulk fluid composition (e.g., gas/vapor, liquid, and/or solid). The capturing of the one or more chemical species may depend on a number of factors, including, but not limited to, selectivity, diffusivity, permeability, solubility, conditions (e.g., temperature, pressure, and concentration), membrane properties (e.g., pore size), and the methods used to fabricate the membranes. In many embodiments, the capturing of the one or more chemical species is achieved via a solution/diffusion gas transport mechanism. The solution/diffusion gas transport mechanism is observed because, among other things, the polyamide-thin-film composite membrane is highly cross-linked, producing a defect-free (e.g., substantially defect free) thin film composite membrane. In this way, the membranes of the present invention are superior to conventional membranes. The presence of surface defects limit conventional membranes to Knudsen diffusion-type mechanisms based on pore flow. As a result, conventional membranes suffer from very low gas selectivity and, accordingly, are not suitable for gas separation applications.

Embodiments of the present disclosure further describe a thin-film composite membrane comprising a defect-free polyamide-thin-film composite membrane for separating fluid compositions, wherein the membrane is formed via an interfacial polymerization reaction in which a porous support impregnated with an aqueous solution containing a diamine is contacted with an organic solution containing an acyl chloride for at least about 5 minutes and at a temperature of at least about 50° C. The defect-free polyamide-thin-film composite membrane may include any of the thin-film composite membranes of the present disclosure and/or formed according to any of the methods of the present disclosure.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

EXAMPLE 1

Materials m-Phenylenediamine (MPD), 99% pure, and trimesoyl chloride (TMC), 98% pure, were purchased from Aldrich. TMC was vacuum distilled at 110° C. before use and stored in a desiccator. The thin-film composite membranes were prepared on mesoporous (ultrafiltration membrane) polysulfone (PS) supports provided by Sepro Membranes Inc. The support is composed of a 50 μm-thick polysulfone resting on a thick (100 μm) macroporous polyester layer. Isoparaffin G (ISOPAR®) was obtained from ExxonMobil and stored with 4 Å molecular sieves to avoid contamination with atmospheric water vapor. Before use, the solvent was filtered using a 0.2 um Teflon mesh. Isopropanol, 99.5+% ACS reagent, was bought from Sigma Aldrich. Deionized water (DIW), 18.2 M cm W×resistivity at 25° C., was obtained from a Millipore Advantage A10 system. A FT-30 variant (RO4) commercial reverse osmosis membrane was purchased from Sepro Inc.

Test gases i.e. helium, hydrogen, oxygen, nitrogen, methane and carbon dioxide were obtained from Specialty Gas Center (SGC), with claimed purities >99.99%.

Experimental

FT-30 style membranes were fabricated varying three parameters: TMC concentration, TMC temperature, and reaction time. The support layers (11.5×15.5 cm) were immersed in tap water for about 24 hours prior to fabrication. About 2 wt/vol % of MPD was dissolved in distilled water and stirred for about 10 minutes. MPD solution was poured in a container and the support was immersed for approximately 5 minutes. The support was then removed and passed through a homemade rubber roller to remove any excess droplets on the surface, then fixed in a Teflon frame with silicone o-rings. Isopar® was heated (as required) and TMC was then added under reflux and allowed to mix for at least about 20 minutes. TMC solution was poured on the polysulfone surface, initiating the reaction. After the specified reaction time, excess solution was poured off. The membrane was immediately washed in the frame three times with about 30 ml of clean Isopar® and then three times with isopropanol. Finally, it was dried at room temperature for about 24 hours and stored in a desiccator until testing. Table 2 lists the TFCs prepared. Data for at least 3 samples is reported for each test.

TABLE 2

| Membrane | c (wt/vol %) | T (° C.) | t (seconds) | m |
|---|---|---|---|---|
| FT-30 variant | Proprietary | | | (N.M) |
| 10s-0.1TMC-20C | 0.1 | 20 | 10 | (N.M) |
| 60s-0.1TMC-20C | 0.1 | 20 | 60 | (N.M) |
| 300s-0.1TMC-20C | 0.1 | 20 | 300 | 0.63 |
| 600s-0.1TMC-20C | 0.1 | 20 | 600 | (N.M) |
| 300s-0.1TMC-60C | 0.1 | 60 | 300 | 0.66 |
| 300s-1TMC-60C | 1.0 | 60 | 300 | 0.55 |
| 300s-10TMC-60C | 10.0 | 60 | 300 | 0.39 |
| 300s-0.1TMC-100C | 0.1 | 100 | 300 | 0.89 |

The membrane designation is defined by: Xs (reaction time in seconds=contact time between organic TMC and aqueous diamine phases); YTMC (TMC concentration in weight/volume percent); zC (organic phase temperature in ° C.).

Figure 3:
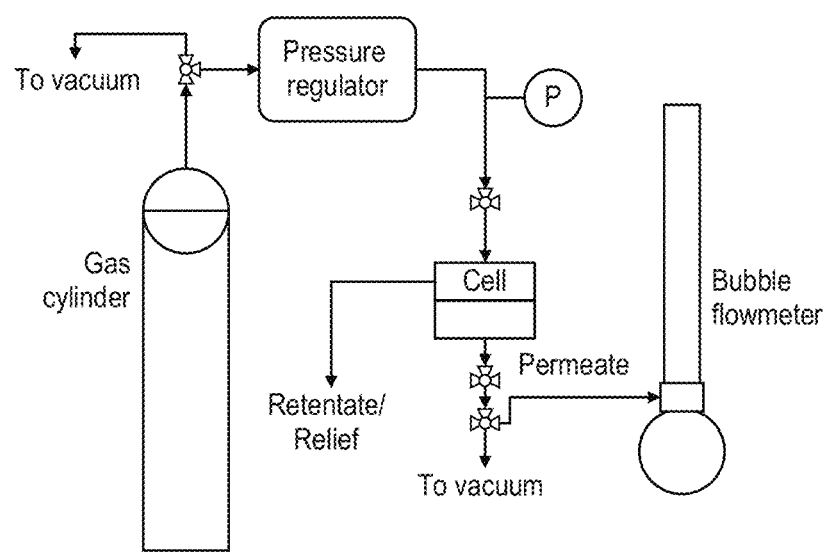
FIG. 3 is a schematic diagram of custom-made thin-film pure-gas permeation setup, according to one or more embodiments of the present disclosure.

FIG. 3 shows the custom-made thin film pure-gas permeation setup used. The system was based on the constant pressure/variable volume method. A Millipore stainless steel cell (active area 13.6 cm$^2$) was connected to a feed, permeate and retentate line. Membrane coupons were cut using an EPILOG mini laser cutter and sealed in the cell. Standard tests were performed at about 22° C.

Prior to the permeation test, both upstream and downstream were evacuated for about 10 minutes. The feed gas was then loaded at about 7.8 bar (100 psig). The permeate side of the membrane was exposed to about atmospheric pressure (1 bar) and the permeate flow rate was measured using a bubble flow meter having a volume 'V' for time 't' with membrane area 'A' at a differential pressure 'Δp'. Time taken to collect 'V' was noted until a stable value was reached (i.e. ±1 s). Permeance (in GPU) was calculated using the following equation:

$$Permeance = \frac{V}{A \times t \times \Delta p}$$

Gas permeation properties were measured in the following order: helium, hydrogen, oxygen, nitrogen, methane and carbon dioxide. Between each gas permeation test, the membrane cell was evacuated for about 10 minutes.

Pure-gas selectivity (α) for each gas pair was calculated using the following equation:

$$\alpha_B^A = \frac{Permeance_A}{Permeance_B}$$

For temperature dependence measurements, the cell was heated using heating tape at the desired test temperature until equilibration. Test gas was permeated through the system for at least 5 min to ensure feed side gas temperature equilibration. Due to small heat capacities of tested gases, the chosen experiment time was more than sufficient. Pure-gas temperature dependence was conducted between about 22-140° C. at about 7.8 bar.

Figure 4:
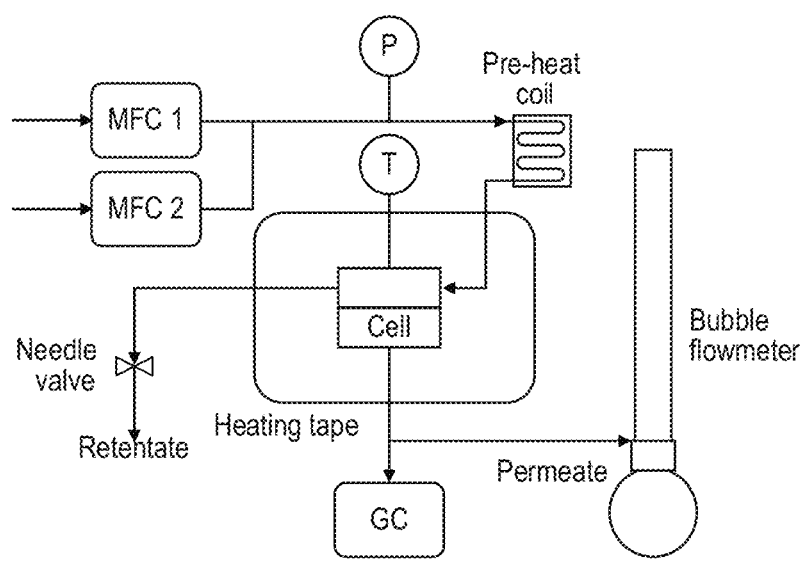
FIG. 4 is a schematic diagram of a mixed-gas permeation system, according to one or more embodiments of the present disclosure.

FIG. 4 shows the apparatus used. Initially, $CO_2$ was permeated through the system for about 30 minutes to ensure no atmospheric oxygen in the lines. The preheat coil and cell heating elements were heated at 140° C. $H_2$ feed was then initiated. Both gases were fed at about 500 ml/min totaling to a cross-flow rate of about 1000 ml/min with $H_2:CO_2$ of 50:50. Flow rate through the membrane was measured using a bubble flow meter and permeate composition was measured using an Agilent Technologies 490 Micro gas chromatograph. The permeate was collected at room temperature.

Separation factor is calculated as following:

$$Separation\ factor\ (\alpha) = \frac{Concentration\ in\ permeate\ H_2 / Concentration\ in\ feed\ H_2}{Concentration\ in\ permeate\ CO_2 / Concentration\ in\ feed\ CO_2}$$

To confirm presence of relevant functional groups on the surface of the TFCs, Fourier transform infrared (FTIR) spectroscopy was conducted using a Thermo scientific Nicolet iS10 spectrometer. A germanium crystal was employed at an angle of 45° to obtain spectra between 4000-400 cm$^{-1}$. Chemical composition of the surface of the TFC was determined employing a PHI-1600 (X-ray photoelectron spectroscopy) system using a penetration depth of 10 nm.

FEI Nova NanoSEM (Scanning Electron Microscope) was used for imaging of the surface and cross-sections of the polymeric films to examine structural features and layer homogeneity. Samples were mounted on a metal holder using double-sided carbon tape and sputter coated with a 2 nm layer of iridium to improve conductivity. Samples for cross-sectional images were obtained after initially removing the polyester support and cracking the PS-polyamide composites after freezing with liquid $N_2$.

Results

Figure 5:
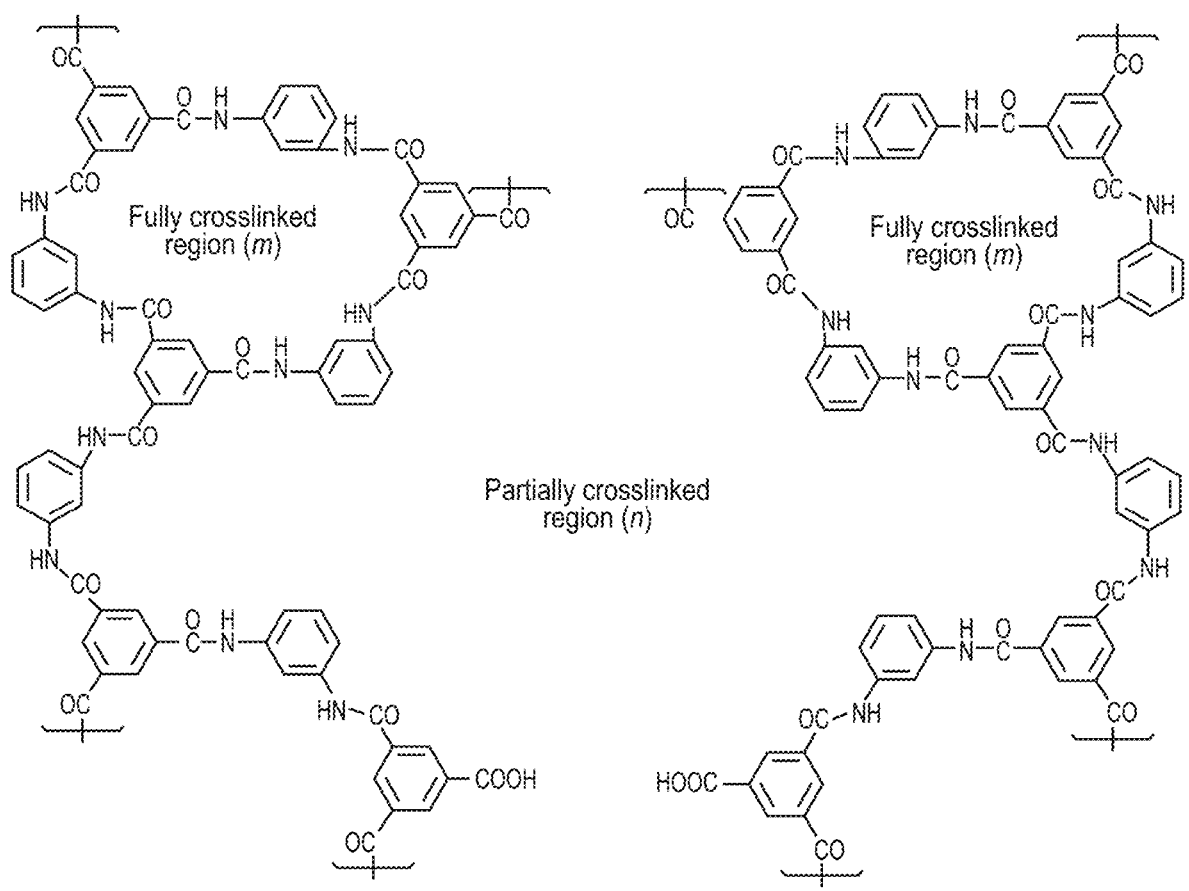
FIG. 5 is a schematic diagram of an aromatic polyamide structure via interfacial polymerization reaction between m-phenylene diamine and trimesoyl chloride, according to one or more embodiments of the present disclosure.
Figure 6A:
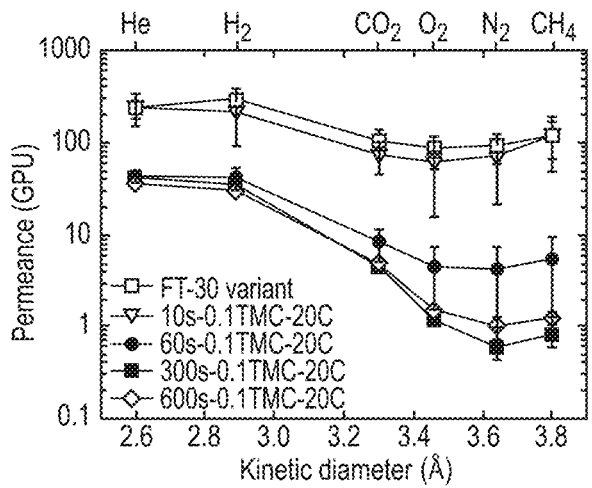
FIGS. 6a-6f are graphical views illustrating pure-gas separation performance of the thin-film composite membranes, according to one or more embodiments of the present disclosure. In particular.
Figure 6B:
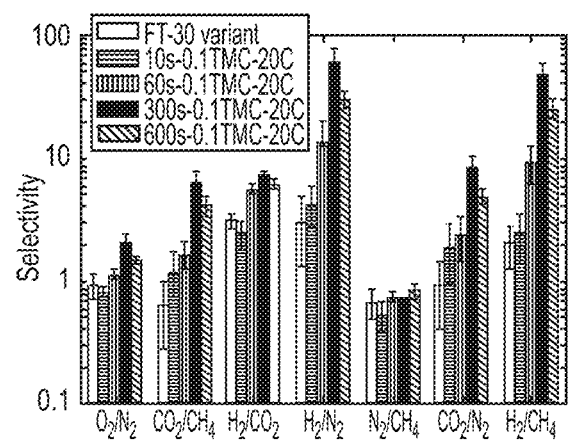
Figure 6C:
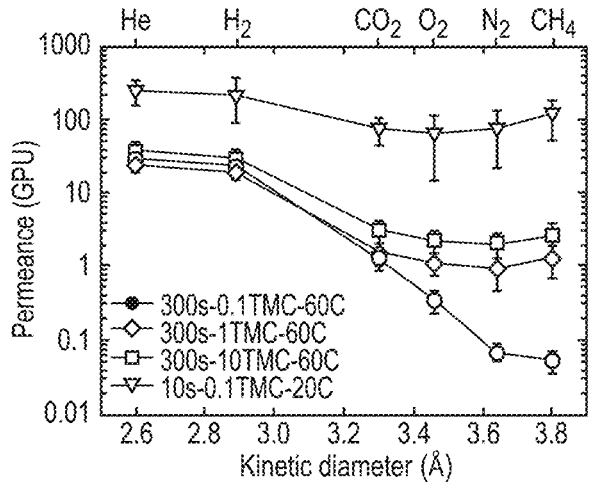

Commercially produced FT-30 membranes are known to contain pores larger than gas molecules, as Knudsen selectivity has been measured in a variety of FT-30 products. FIG. 5 is a schematic diagram illustrating the structure of a partially cross-linked polyamide fabricated by reacting m-phenylene (MPD) and trimesoyl chloride (TMC) on polymeric supports, commercially named FT-30. It is widely known that these membranes are made with reaction times under one minute. FIGS. 6a and 6b show how defect-free characteristics started to emerge at longer reaction times, increasing selectivity. Permeance for $H_2$ and He decreased 10-fold while an average decrease of 100-fold was observed for larger gases. This occurred as MPD continued to diffuse into the reaction zone over time, filling larger defect-pores with polymer. Once this occurred, the mode of transport shifted from Knudsen flow to solution-diffusion, and selectivity increased at 1 min, reaching an optimum at 5 minutes or greater. 10s-0.1TMC-20C samples demonstrated identical properties to a commercial FT-30 variant (RO4) and were used as the reference for comparing the performance of the TFCs in this work.

FIGS. 6c-6f show the effects of varying TMC concentration and temperature. A clear trend started to emerge for gases larger than hydrogen (kinetic diameter $k_d$>2.89 Å). No significant variation was observed for helium and hydrogen. FTIR spectra (FIG. 7) confirmed the presence of polyamide on all supports, with no visible difference in chemistry from the established standard, 10s-0.1TMC-20C. As the ratio of amine to acyl chloride increased (i.e. TMC concentration decreases), permeance for $CO_2$ and larger gases decreased due to increased crosslinking, evidence of which can be seen in Table 2. This can be visualized as the shrinking of free volume elements resulting in narrower pathways, hindering transport for larger gas molecules while having no significant effect on smaller ones, boosting selectivity. Similarly, increase of organic-phase temperature resulted in increased crosslinking, affecting gases larger than $H_2$, translating to significant enhancements in selectivity. This was counterintuitive because the reaction between MPD and TMC is exothermic, and heating the organic phase is expected to lower the rate of polymer formation, as equilibrium shifts to reduce heat in the system, resulting in non-continuous films with decreased crosslinking. However, increase in reaction-zone temperature increased the overall reaction rate (or reaction kinetics) as well as solubility and diffusivity of MPD in the organic phase (reaction zone), resulting in increased formation of amide linkages and, hence, increased crosslinking.

Figure 7:
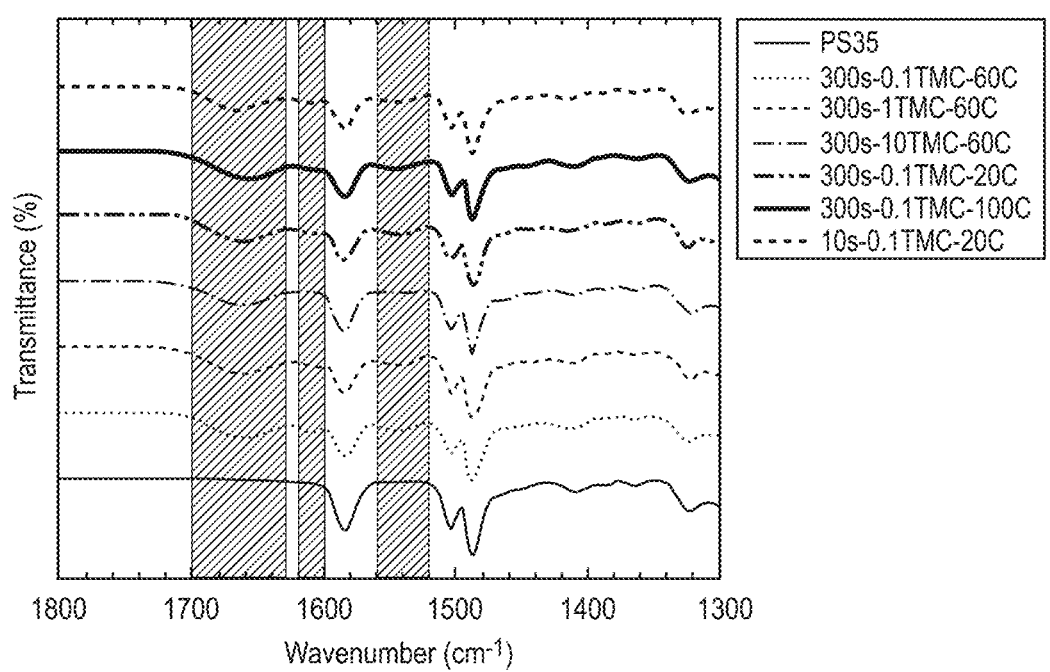
FIG. 7 is FTIR spectra for polysulfone and thin-film composite membranes of the present disclosure, according to one or more embodiments of the present disclosure.

FIG. 7 shows the FTIR spectra of the TFCs along with bare polysulfone support. After the IP reaction, three new peaks appeared. The peaks at 1545 $cm^{-1}$ and 1660 $cm^{-1}$ confirmed the presence of amide groups on the surface of the composite membrane. The former related to C=O stretching in amide I while the latter corresponded to N—H bending in amide II amide linkage. The peak at 1610 $cm^{-1}$ was associated with aromatic ring breathing. Because the penetration depth of the IR beam was >0.3 µm, the spectrum of the polysulfone was clearly visible even after the support was coated with interfacially polymerized polyamide.

Figure 6D:
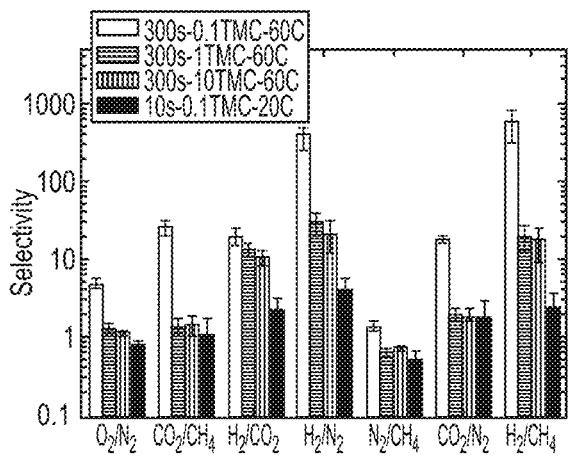
Figure 6E:
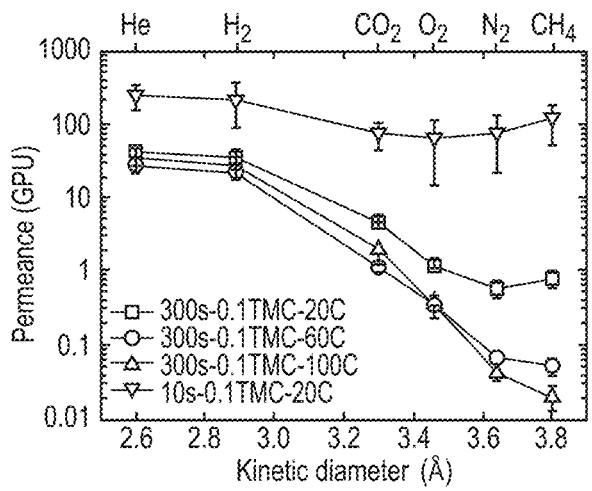
Figure 6F:
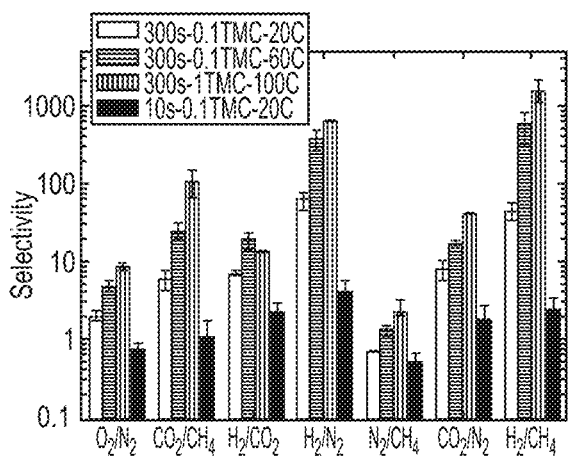

FIGS. 6d-6f show the same results expressed in terms of selectivity. High selectivity for $H_2/CO_2$ and negligible selectivity for $He/H_2$ implied a primary molecular-sieve-like cut-off around 3 Å ($k_d$ for He and $CO_2$ are 2.60 Å and 3.30 Å respectively).

XPS measurements were performed to obtain information about the chemical surface composition of the TFCs. Relative atomic concentrations and degree of cross-linking were determined. Degree of crosslinking, m, measured by XPS, is given in Table 3. "m" describes the relative fractions of fully cross-linked regions in the polymer film. See FIG. 5. As m increased from 0.39 to 0.66, selectivity of hydrogen over $CO_2$, $O_2$, $N_2$ and $CH_4$ increased, implying a decrease in the free volume elements or pores larger than 3 Å (i.e. increased ultramicroporosity). As crosslinking increased further from 0.66 to 0.89, $N_2$ and $CH_4$ permeances decreased ($k_d$ for $N_2$ and $CH_4$ are 3.64 Å and 3.80 Å respectively) but $CO_2$ and $O_2$ remain unaffected. This can be explained by a reduction in pores larger than 3.5 Å. As a consequence, $O_2/N_2$, $CO_2/N_2$ and $CO_2/CH_4$ selectivities increased. These are all important large-scale separation applications.

TABLE 3

XPS data for fabricated TFCs

| Membrane | C (%) | O (%) | N (%) | N/O | M |
|---|---|---|---|---|---|
| 10s-0.1TMC-20C | 76.0 | 13.5 | 10.5 | 0.78 | 0.63 |
| 300s-0.1TMC-60C | 76.0 | 13.4 | 10.7 | 0.79 | 0.66 |
| 300s-1TMC-60C | 76.5 | 13.5 | 10.0 | 0.74 | 0.55 |
| 300s-10TMC-60C | 76.2 | 14.3 | 9.5 | 0.66 | 0.39 |
| 300s-0.1TMC-20C | 76.0 | 13.5 | 10.5 | 0.78 | 0.62 |
| 300s-0.1TMC-100C | 77.5 | 11.7 | 10.9 | 0.93 | 0.89 |

$H_2/CO_2$ selectivity decreased in 300s-0.1TMC-100C compared to 300s-0.1TMC-60C, despite increased crosslinking. This effect arose due to the high solubility of $CO_2$, compared to other gases, in amide linkages present in the highly crosslinked membranes. This resulted in higher $CO_2$ permeance despite an expected decrease in diffusivity. Revisiting the chemical structure of the polyamide formed using MPD and TMC, distinct fully and partially crosslinked regions were formed, as depicted in FIG. 5. Other studies have discussed the structure-function relationship of MPD-TMC polymer using positron annihilation lifetime spectroscopy (PALS) and measured a bimodal pore distribution, i.e. relatively smaller ultramicropores in completely crosslinked regions and larger micropores in partially crosslinked regions (termed network and aggregate pores). The permeance data of the present disclosure imply apparent ultramicropore and micropore sizes of around 3 Å and 3.5 Å respectively.

Figure 9:
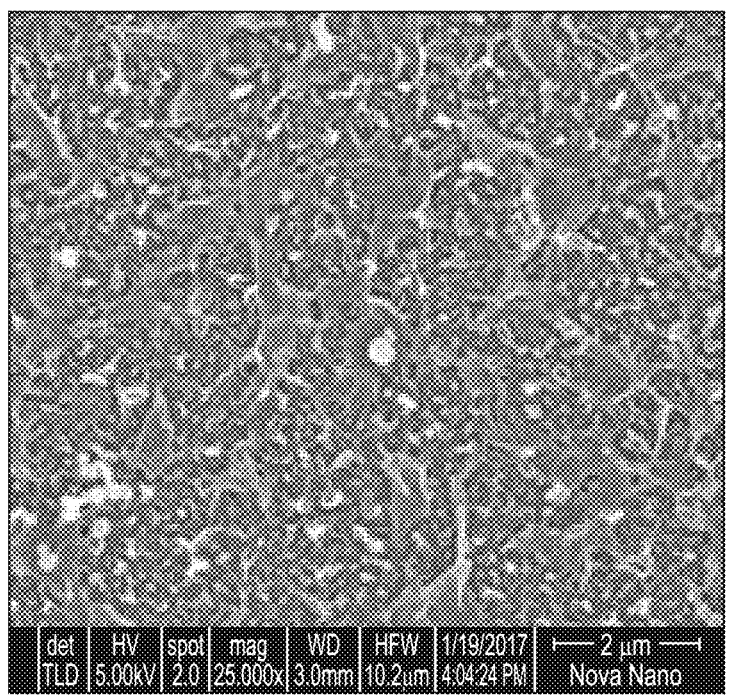
FIG. 9 is a SEM image of fabricated thin-film composite membranes, according to one or more embodiments of the present disclosure.
Figure 10A:
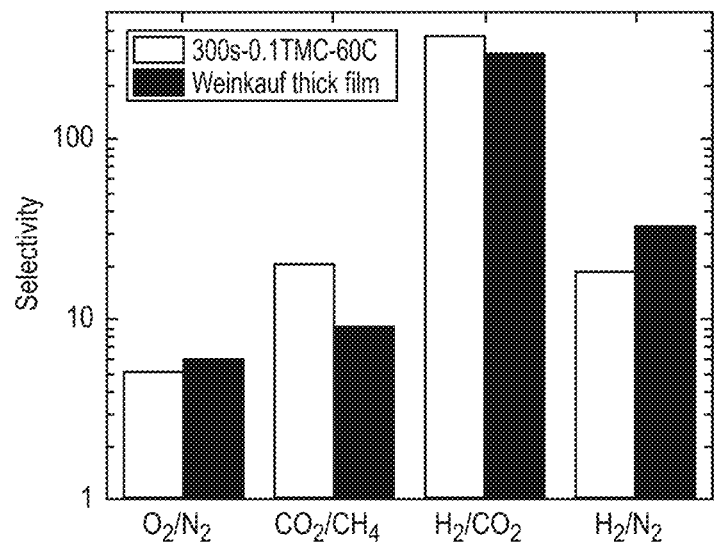
FIGS. 10a-10b are graphical views of comparisons of a 0.1TMC-60 thin-film composite membrane and thick, isotropic poly(p-phenylene terephthalamide) film, including (a) pure-gas selectivity data and (b) permeability data (0.1TMC-60 thickness was assumed to be 7.5 nm), according to one or more embodiments of the present disclosure.
Figure 10B:
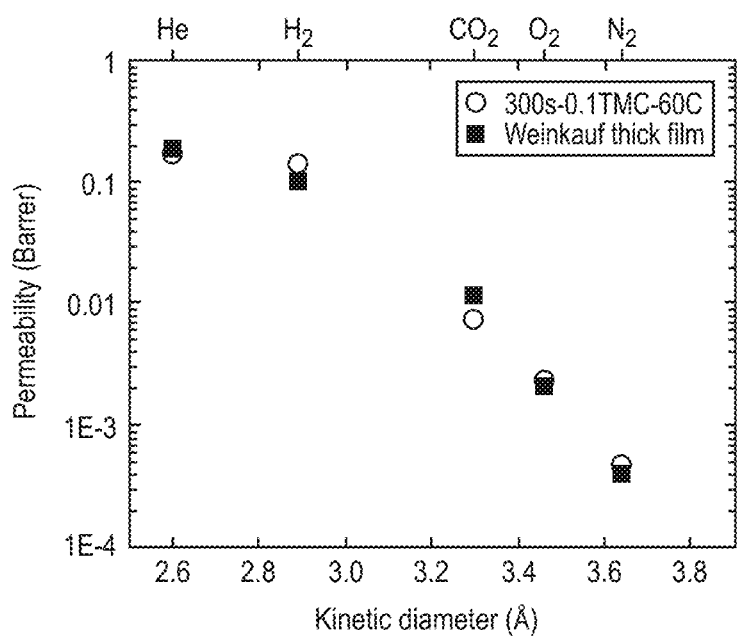

The TFCs exhibit ridge-and-valley structure, FIG. 9. 300s-10TMC-60C showed a relatively smoother structure compared to all other TFCs. This was due to the high TMC concentration used, resulting in formation of a secondary polymer layer of significantly decreased crosslinking on the rough surface. FIGS. 10a-10b depict coupling selectivity data for 300s-0.1TMC-60C and poly(p-phenylene terephthalamide) reveals almost identical gas separation capabilities for both polymers. An estimate of 300s-0.1TMC-60C film thickness, assuming both polymers showed similar permeability, was then be made as 6.5 nm. Accounting for under-estimation of active surface area by a factor of 1.5 (due to rough surface structure) implied an effective membrane thickness of 10 nm shedding light on a much debated topic of effective barrier layer separation in MPD-TMC films.

Despite barrier polyamides showing moderate to high selectivity for a number of gas separations, they exhibited particularly low permeabilities and have subsequently been overlooked for gas separation processes. Though, this disadvantage can be overcome by fabricating ultra-thin films, as in the present disclosure, allowing the exploitation of highly selective barrier materials with industrially useable performance characteristics.

Figures 8A, 8B:
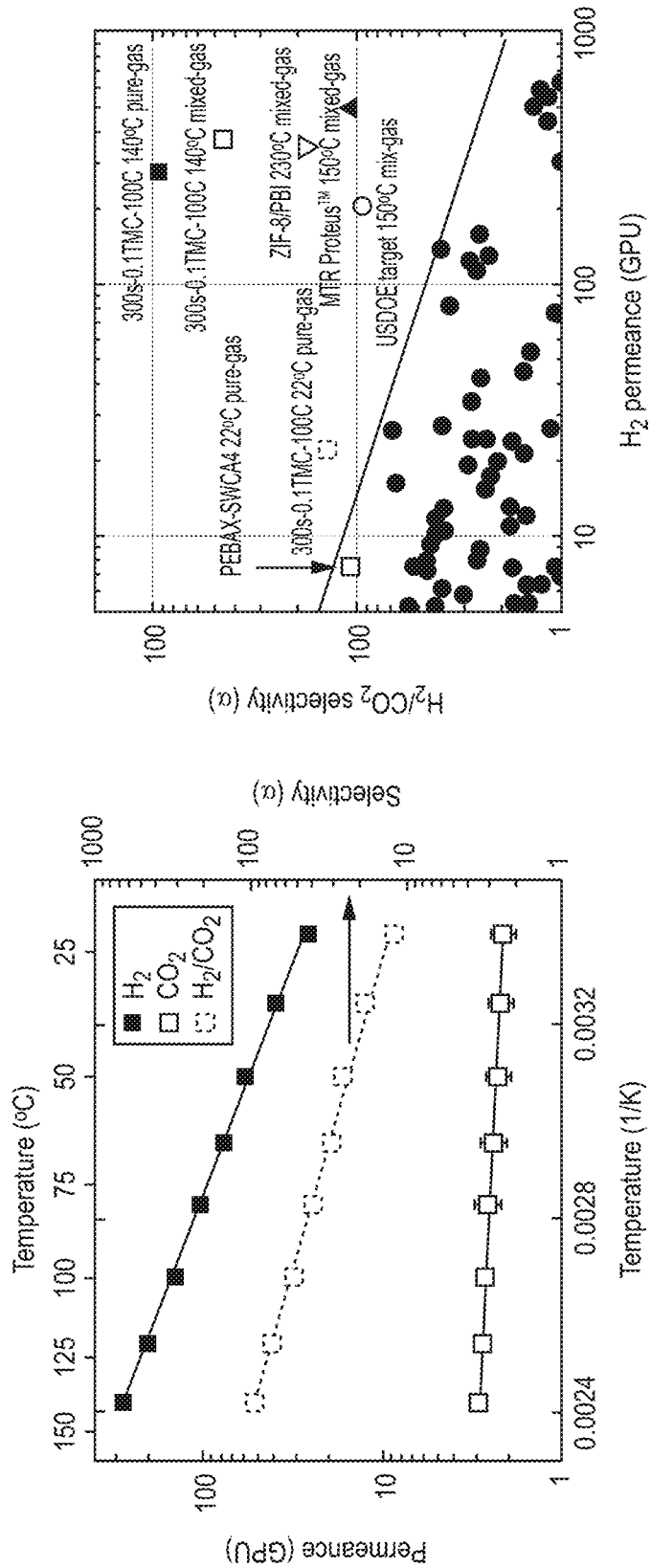
FIGS. 8a-8b illustrate gas separation performance, according to one or more embodiments of the present disclosure. In particular.

One of the primary requirements for membranes in this application was stability at high temperature and pressure: feed temperature between 120-150° C. and pressure above 150 psi. 300s-0.1TMC-60C and 300s-0.1TMC-100C showed excellent potential for syngas separations at 22° C. i.e. $H_2$ permeance values of ≈19 and 22 GPU with selectivity of 19 and 14 over $CO_2$. FIG. 8a shows how this performance varies with temperature, using pure-gas $H_2$ and $CO_2$ measurements for 300s-0.1TMC-100C films. Though 300s-0.1TMC-60C shows higher selectivity at room temperature, it was hypothesized that 300s-0.1TMC-100C will show superior $H_2/CO_2$ separation properties at higher temperatures due to higher crosslinking and decreased role of $CO_2$ sorption at elevated temperature. Permeance, for both gases, showed excellent Arrhenius regression with temperature, but $H_2$ permeance increased much more than $CO_2$. This is, again, due to decreased sorption of $CO_2$ at higher temperatures. At 140° C., $H_2$ permeance increased to 275±4 GPU with $H_2/CO_2$ selectivity of 95.5±5, the highest reported pure-gas selectivity to date of any polymer membrane.

Mixed-gas separation was conducted to verify performance in industrial systems. FIG. 8b shows pure- and mixed-gas data for 300s-0.1TMC-100C compared to conventional membranes on the Robeson plot. Average stabilized $H_2$ permeate concentration of 98% was achieved, translating to a separation factor of 50±4 with hydrogen permeance of 377±17 GPU. Compared to pure-gas high-temperature results, mixed-gas hydrogen permeance was 37% higher and $CO_2$ permeance was 200% higher, resulting in a selectivity decrease of 48%. Competitive sorption of $CO_2$ swelled the polymer matrix, resulting in elevated permeance for both gases. The permeance of the slower penetrant experienced a larger increase, so selectivity decreased. It should be noted that mixed-gas separation performance was under-estimated in this study, due to high stage cut in the test cell. Even without accounting for this experimental shortcoming, 300s-0.1TMC-100C showed unparalleled performance for $H_2/CO_2$ separation and was well above state-of-the-art polymers noted in literature and industry.

Figure 11:
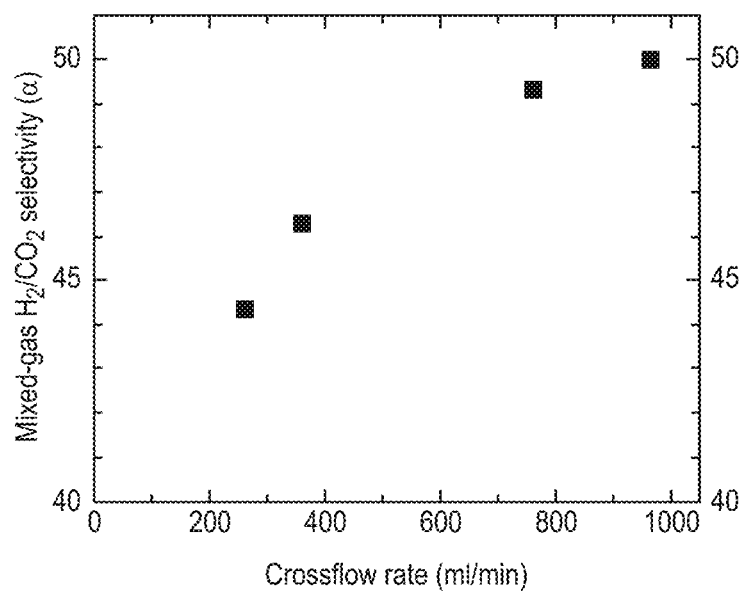
FIG. 11 is a graphical view illustrating an effect of cross-flow rate on 0.1TMC-100 $H_2/CO_2$ separation factor, according to one or more embodiments of the present disclosure.

Mixed-gas separation was performed at a cross-flow rate of approximately 1000 ml/min due to equipment and safety considerations which translates approximately to about a 7% stage-cut. A high stage-cut can result in miscalculation of driving force for each component for a multi-component system. In this case, driving force for each component was normalized using the log-mean of molar flow rate in the feed and permeate. Furthermore, a low cross-flow rate can result in increased surface concentration for the slower penetrant, concentration polarization, resulting in under-estimation of separation capabilities. Poor mixing in permeation cells can further add to this effect. The experiment should be run at a cross-flow rate of approximately 7000 ml/min and FIG. 11 shows a summarized effect of this phenomenon in this case.

In sum, the growing need for cleaner energy is dramatically increasing interest in the membrane market. Highly crosslinked, ultra-selective, defect-free MPD-TMC membranes were successfully fabricated showing tremendous potential for $H_2/CO_2$ separation in syngas applications as well as a number of other challenging gas separations. These membranes exhibit unprecedented $H_2/CO_2$ selectivity, surpassing all other reported polymers and lying well above the 2008 Robeson upper bound.

Coupled with excellent $H_2/CH_4$ separation properties, given the targets specified by the USDOE, the membranes are excellent candidates for hydrogen purification from syngas. Fortuitously, these ultra-high-performance membranes can be created by making only small changes to existing commercial membrane lines. Therefore their fabrication cost should be similar to standard RO membranes—only 1-2 \$/ft². Varying fabrication parameters can fine-tune permselectivity to meet the needs of specific processes. A few simple modifications to a time-tested commercial membrane fabrication process can produce membranes that meet a key industrial need.

These membranes also demonstrated remarkable separation performance for $O_2/N_2$, $CO_2/CH_4$, $H_2/N_2$ and $CO_2/N_2$ separations. With rapidly developing economic and environmental pressures to increase efficiency for separation processes, such highly-selective, low-cost commercial barrier materials fabricated as ultra-thin films show potential for a paradigm shift to streamline industrial use of membranes for a large number of gas separation applications.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A method of fabricating a thin-film composite membrane for gas separations, comprising:
    immersing a porous support in an aqueous solution containing a diamine;
    heating an organic solution containing a multifunctional acyl chloride to a temperature of at least 100° C.;
    after said immersing and said heating, contacting the porous support with the organic solution containing the multifunctional acyl chloride for a duration of 5 minutes or greater to form via interfacial polymerization a defect-free polyamide thin film on the porous support, wherein the degree of crosslinking of the polyamide thin film is about 0.89 or greater;
    removing excess organic solution, wherein the excess organic solution is not removed until after the passage of the contacting duration, and
    drying the thin-film composite membrane, wherein the drying only requires temperatures at about room temperature.

2. The method of claim 1, wherein the diamine is m-phenylene diamine, p-phenylene diamine, 3,5-diaminobenzoic acid, 2,4-diaminotoluene, 2,6-diaminotoluene, 2,4-diaminophenol, diamino resorcinol, 3,5-diaminobenzonitrile, or piperazine.

3. The method of claim 1, wherein the porous support includes polysulfone, polyethersulfone, polyimide, polyetherimide, polyacrylonitrile, cellulose ester, polypropylene, polyvinyl chloride, polyvinylidene fluoride, poly (arylether) ketones, alumina, silica, zirconia, titania, carbon, or steel.

4. The method of claim 1, wherein the organic solution and aqueous solution are substantially immiscible.

5. The method of claim 1, wherein the organic solution includes toluene or 1,1,2-trichloroethane.

6. The method of claim 1, wherein a concentration of the acyl chloride in the organic solution is less than about 1 wt/vol %.

7. The method of claim 1, wherein the acyl chloride is trimesoyl chloride, terephthalic acid chloride, or isophthalic acid chloride.

8. The method of claim 1, wherein a thickness of the polyamide thin film is about 10 nm.

9. The method of claim 1, wherein the drying step is performed without any intermediate exposure to heat.

10. A method of gas separation comprising contacting a thin-film composite membrane formed according to the method of claim 1 with a fluid composition comprising at least $H_2$ and $CO_2$, and separating $H_2$ from the $CO_2$.

* * * * *